United States Patent
Buck (10) Patent No.: US 9,305,150 B2
(45) Date of Patent: Apr. 5, 2016

(54) METHOD AND SYSTEM FOR MANAGING USER LOGIN BEHAVIOR ON AN ELECTRONIC DEVICE FOR ENHANCED SECURITY

(71) Applicant: Lookout, Inc., San Francisco, CA (US)

(72) Inventor: Brian James Buck, Livermore, CA (US)

(73) Assignee: LOOKOUT, INC., San Francisco, CA (US)

(*) Notice: Subject to any disclaimer, the term of this patent is extended or adjusted under 35 U.S.C. 154(b) by 0 days.

(21) Appl. No.: 13/709,400

(22) Filed: Dec. 10, 2012

(65) Prior Publication Data

US 2014/0165169 A1   Jun. 12, 2014

(51) Int. Cl.
| | |
|---|---|
| *G06F 7/04* | (2006.01) |
| *H04L 29/06* | (2006.01) |
| *G06F 21/31* | (2013.01) |
| *G06F 21/46* | (2013.01) |

(52) U.S. Cl.
CPC ............... *G06F 21/31* (2013.01); *G06F 21/46* (2013.01); *H04L 63/06* (2013.01); *H04L 63/083* (2013.01); *H04L 63/123* (2013.01)

(58) Field of Classification Search
CPC ....... G06F 21/46; G06F 21/31; H04L 63/083; H04L 63/123; H04L 63/06
USPC .......................................................... 726/7
See application file for complete search history.

(56) References Cited

U.S. PATENT DOCUMENTS

| | | | | |
|---|---|---|---|---|
| 8,145,913 B1* | 3/2012 | Zaitsev | | 713/183 |
| 8,180,054 B2* | 5/2012 | Sakamoto | | H04L 9/3236 380/258 |
| 8,578,476 B2* | 11/2013 | Sama | | 726/19 |
| 8,806,647 B1 | 8/2014 | Daswani et al. | | |
| 2005/0149763 A1* | 7/2005 | Nakao | | 713/202 |
| 2006/0017692 A1* | 1/2006 | Wehrenberg | | G06F 1/1616 345/156 |
| 2007/0180207 A1* | 8/2007 | Garfinkle | | 711/162 |
| 2007/0198597 A1* | 8/2007 | Betz et al. | | 707/201 |
| 2008/0066167 A1* | 3/2008 | Andri | | 726/5 |
| 2008/0181403 A1* | 7/2008 | Sakamoto | | H04L 9/3236 380/258 |
| 2008/0282091 A1* | 11/2008 | Ashok et al. | | 713/183 |
| 2009/0106825 A1* | 4/2009 | Cerruti et al. | | 726/5 |
| 2010/0074509 A1* | 3/2010 | Laaser et al. | | 382/138 |
| 2010/0125906 A1* | 5/2010 | Golle et al. | | 726/18 |

(Continued)

OTHER PUBLICATIONS

Wagner, Robert A., "The String-to-Strong Correction Problem", Journal of the Association for Computing Machinery, vol. 21, No. 1, Jan. 1974, pp. 168-173.

(Continued)

*Primary Examiner* — Ashok Patel
*Assistant Examiner* — Gary Gracia
(74) *Attorney, Agent, or Firm* — Dergosits & Noah LLP (57) ABSTRACT

Security is enhanced for a user of an electronic device by providing a method for managing user login behavior. When an entered password that is different from a defined password is received, the method includes identifying alternative characters for at least one character of the entered password based on a location of a key corresponding to the character of the entered password on a keyboard used to enter the password. When the alternative characters are identified, a variation of the entered password is generated by replacing a character of the entered password with an alternative character of the character. When information relating to the variation matches information relating to the defined password, the entered password is determined to be valid.

16 Claims, 6 Drawing Sheets

(56) References Cited

U.S. PATENT DOCUMENTS

| | | | |
|---|---|---|---|
| 2010/0169959 A1* | 7/2010 | Gavrilos et al. | 726/7 |
| 2011/0016111 A1* | 1/2011 | Xie et al. | 707/723 |
| 2012/0167202 A1* | 6/2012 | Kim | G06F 21/42 726/19 |
| 2012/0169760 A1* | 7/2012 | Mochizuki | G06F 21/31 345/618 |
| 2013/0031365 A1* | 1/2013 | Park | G06F 21/31 713/164 |
| 2013/0050106 A1* | 2/2013 | Chung et al. | 345/173 |
| 2013/0067566 A1* | 3/2013 | Oh | G06F 21/31 726/19 |
| 2013/0086695 A1* | 4/2013 | Lakshminarayanan | G06F 21/31 726/28 |

OTHER PUBLICATIONS

Hirschberg, D.S., "A Linear Space Algorithm for Computing Maximal Common Subsequences", Communications of the Association for Computing Machinery, vol. 18, No. 6, Jun. 1975.

* cited by examiner

METHOD AND SYSTEM FOR MANAGING USER LOGIN BEHAVIOR ON AN ELECTRONIC DEVICE FOR ENHANCED SECURITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more embodiments relate generally to handheld electronic devices and more specifically to systems and methods for managing user login behavior on an electronic device for enhanced user security.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Mobile electronic communication devices have evolved beyond simple telephone functionality and are now highly complex multifunctional devices with capabilities rivaling those of desktop or laptop computers. In addition to voice communications, many mobile communication devices are capable of text messaging, e-mail communications, internet access, and the ability to run full-featured application software. Mobile communication devices can use these capabilities to perform online transactions such as banking, stock trading, payments, and other financial activities. Furthermore, mobile communication devices used by an individual, a business, or a government agency often store confidential or private information in forms such as electronic documents, text messages, access codes, passwords, account numbers, e-mail addresses, personal communications, phone numbers, and financial information.

Typically, when a mobile communication device has not been used for a period of time or when it is powered on, it is placed in a locked mode to prevent unauthorized use and to protect the device owner's private information stored on the device. In order to unlock the device, a user typically must enter an unlock password. In most cases, the device's owner creates the password, which is some combination of characters on a keyboard. When a strong, i.e., difficult to guess, password is created, the device and its contents can be better protected from malicious use. According to some experts, a strong password:

Is at least eight characters long.
Does not contain the owner's user name, real name, or company name.
Does not contain a complete word.
Is significantly different from previous passwords.
Contains characters from each of uppercase letters, lowercase letters, numbers and symbols found on the keyboard and spaces.

Additional suggestions for creating a strong password include:

Creating an acronym from an easy-to-remember piece of information. For example, picking a phrase that is meaningful, such as My son's birthday is 12 Dec. 2004, and using that phrase, creating Msbi12/Dec,4 as the password.
Substituting numbers, symbols, and misspellings for letters or words in an easy-to-remember phrase.
Relating the password to a favorite hobby or sport. For example, I love to play badminton could become ILuv2PlayB@dm1nt( ).

(Adapted from http://windows.microsoft.com/en-US/windows-vista/Tips-for-creating-a-strong-password).

In addition to protecting electronic devices from unauthorized and/or malicious use, passwords also protect user accounts provided by cloud-based online services. For example, as noted above, online banking, payments, and financial services are common, and electronic access to those services and accounts are also password protected. Because many of those accounts provide access to private and sensitive information and significant opportunity for malfeasance, strong password protection is highly recommended, if not required. For example, some online services require the user to create a password that meets specified criteria such as those listed above.

Creating strong and long passwords for the user's electronic devices and for the user's online accounts enhances user security and prevents others from misappropriating the user's information. These passwords, however, usually take more time, and are usually more difficult, to enter. This is especially true when the user is entering the password on her mobile communication device, which has a smaller form factor and typically provides a small touch sensitive virtual keyboard with tiny keys. Entering incorrect password characters on such a small keyboard is common and results in invalid password notifications.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present invention. In this specification, these implementations, or any other form that the invention may take, may be referred to as techniques. In general, the order of the steps of disclosed processes may be altered within the scope of the invention.

Systems and methods are provided for managing user login behavior on an electronic device to enhance user security. In particular, the inventive systems and methods permit certain types of user input errors during password entry so that the entered password is validated even though the entered password fails to match the defined password. According to an embodiment, a password validation service can receive an entered password that is different from a defined password. Instead of rejecting the entered password because it fails to match the defined password, the password validation service can identify alternative characters for at least one character of the entered password based on a location of a key corresponding to the character of the entered password on a keyboard used to enter the password. When the alternative characters are identified, the password validation service can generate a variation of the entered password by replacing a character of the entered password with an alternative character of the character. More than one character of the entered password can be replaced with one of its alternative characters. When the variation matches the defined password, the password validation service determines that the entered password is valid.

According to an embodiment, the password validation service can be implemented by a password protected electronic client device, such as a mobile communication device. Alternatively or in addition, the password validation service can be implemented by a server providing at least one password protected service. Accordingly, the forgiving login user behavior (FLUB) method provided by the password validation service makes it easier for users to employ long and strong passwords, while making it easier for them to actually type and use such passwords.

As used herein, the term "mobile communication device" refers to mobile phones, tablets, PDAs and smartphones. The term "mobile communications device" also refers to a class of laptop computers which run an operating system that is also used on mobile phones, tablets, PDAs, or smartphones. Such laptop computers are often designed to operate with a continuous connection to a cellular network or to the internet via a wireless link. Specifically, mobile communication devices include devices for which wireless communication services such as voice, messaging, data, or other wireless Internet capabilities are a primary function. As used herein, a "mobile communication device" may also be referred to as an "electronic client device," "mobile device," "mobile client," or "handset." However, a person having skill in the art will appreciate that while the present invention is disclosed herein as being used on mobile communication devices, the present invention may also be used on other computing platforms, including desktop, laptop, notebook, netbook, or server computers.

As used herein, the term "client computer" refers to any computer, embedded device, mobile device, or other system that can be used to perform the functionality described as being performed by the client computer. Specifically, client computers include devices which can be used to display a user interface by which the functionality provided by a server can be utilized by a user. Client computers may be able to display a web page, load an application, load a widget, or perform other display functionality that allows the client computer to report information from the server to the user and to receive input from the user in order to send requests to the server.

Figure 1:
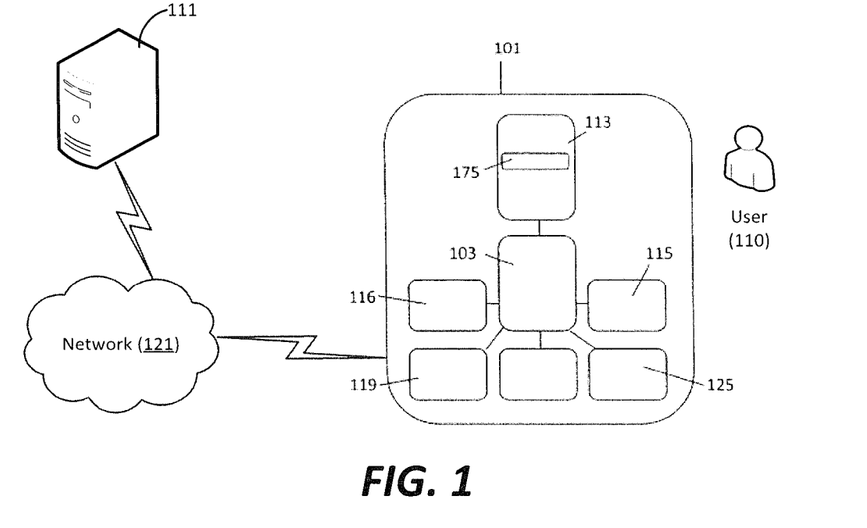
FIG. 1 is a block diagram illustrating an exemplary system including an electronic device and a server coupled to a network according to an embodiment.

Prior to describing the subject matter in detail, an exemplary mobile communication device in which the subject matter may be implemented shall first be described. Those of ordinary skill in the art will appreciate that the elements illustrated in FIG. 1 may vary depending on the system implementation. With reference to FIG. 1, a block diagram of an embodiment of the mobile communication device 101 is illustrated. The mobile device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between application programs and the mobile device hardware components. In an embodiment, the mobile device 101 receives data through an RF transceiver(s) 116 which may be able to communicate via various networks, for example: Bluetooth, local area networks such as WiFi, and cellular networks such as GSM, CDMA or LTE.

In an embodiment, a local software component 175 is an application program that is downloaded to a mobile device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. patent application Ser. No. 12/255,626, entitled "SYSTEM AND METHOD FOR A MOBILE CROSS-PLATFORM SOFTWARE SYSTEM." In another embodiment, the local software component 175 can be device, platform or operating system specific.

The mobile device 101 may operate in a networked environment using logical connections to one or more remote nodes 111 via a communication interface. The remote node may be another computer, a server, a router, a peer device or other common network node, and typically includes many or all of the elements described above relative to the mobile device 101. The communication interface may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like.

It should be understood that the arrangement of mobile communication device 101 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

Figure 2:
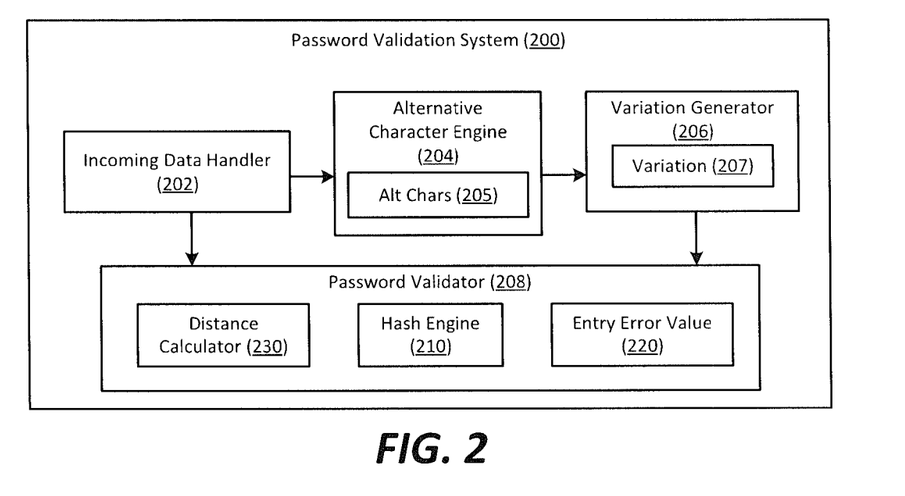
FIG. 2 a block diagram illustrating an exemplary system for managing login user behavior on an electronic device according to an embodiment.

FIG. 2 is a block diagram of an exemplary system 200 having components, and/or their analogs, that are configured to manage the FLUB method according to an embodiment. As is shown in FIG. 2, the system 200 can include an arrangement of components configured for managing user login behavior on an electronic device for enhanced user security. According to an embodiment, the password validation system 200 can include an incoming data handler 202 configured to receive information relating to an entered password or information relating to a password defined by the user 110. The defined password can be associated with an electronic device, e.g. 101, or with a password protected service hosted by the server 111.

The password validation system 200 can also include, in an embodiment, an alternative character engine 204 configured to identify alternative characters for a character of a password. Alternative characters can be identified based on a location of a key corresponding to the character on a keyboard used to enter the character. According to an embodiment, depending on the keyboard used, the alternative characters for the character can be different. The alternative character engine 204 can be configured to differentiate between the different types of keyboards and to identify the alternative characters corresponding to the appropriate keyboard.

In an embodiment, the password validation system 200 can include a variation generator 206 that is configured to generate variations of a password using the alternative characters of the password. In an embodiment, the variation generator 206 can replace one or more of the characters of the password with the respective alternative characters and provide the variation to a password validator 208 which is configured to compare the password variation with the defined password. Based on the comparison, the password validator 208 can determine that the entered password is valid when the variation of the entered password matches the defined password.

Figure 3:
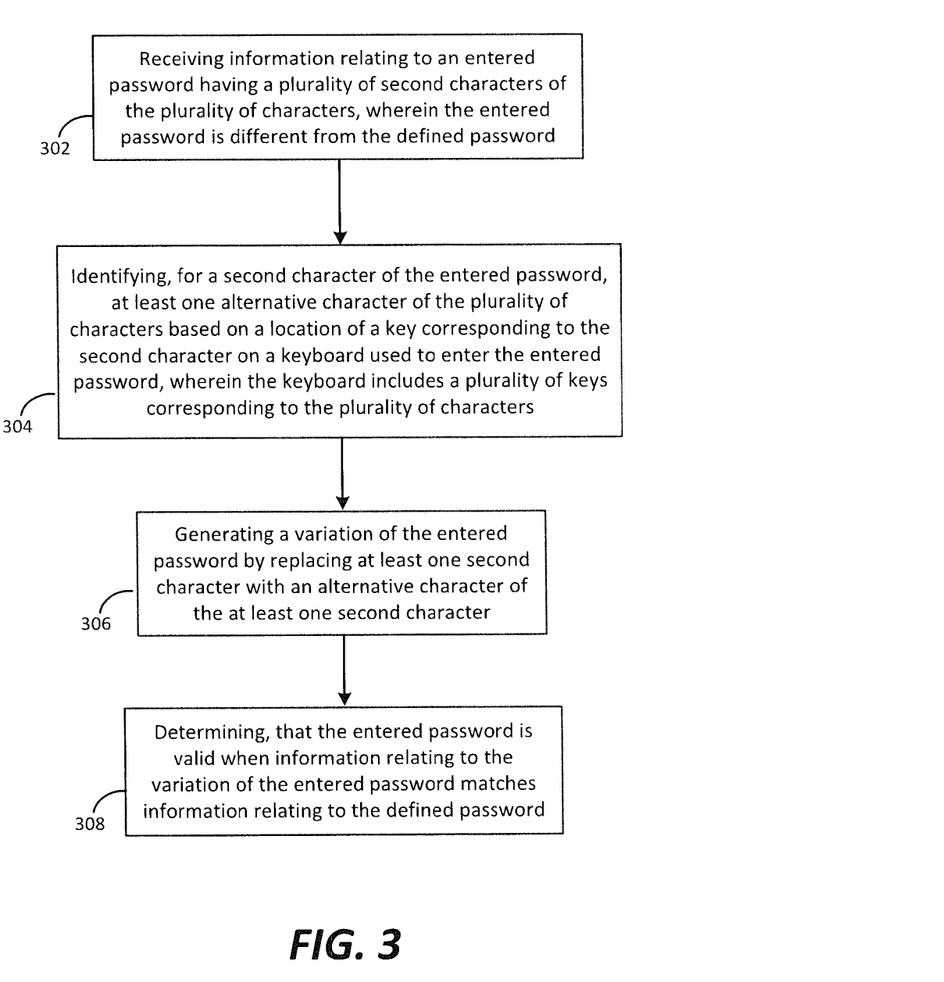
FIG. 3 is an operational flow diagram illustrating a high level overview of an exemplary method for managing login user behavior on an electronic device according to an embodiment.

FIG. 3 is a flow diagram illustrating a method for managing user login behavior on an electronic device according to an exemplary embodiment. The method illustrated in FIG. 3 can be carried out by, for example, at least some of the components in the exemplary arrangement of components illustrated in FIG. 2. In an embodiment, the components illustrated in FIG. 2 can be configured to operate within an execution environment hosted by an electronic device and/or multiple electronic devices, as in a distributed execution environment.

Referring now to FIG. 3, a flow diagram is presented illustrating a FLUB method 300 for managing user login behavior on an electronic device according to an exemplary embodiment. In an embodiment, the exemplary system 200 illustrated in FIG. 2 includes an arrangement of components configured to implement the method 300, which also can be carried out in environments other than that illustrated in FIG. 2. According to an embodiment, the method 300 begins, in block 302, when information relating to an entered password having a plurality of second characters of a plurality of characters is received. When the entered password is different from the password defined by the user 110, at least one alternative character of the plurality of characters is identified, in block 304, for at least one second character of the entered password. As noted above, the alternative characters of a second character can be identified based on a location of a key corresponding to the second character on a keyboard used to enter the second character.

Once the alternative characters have been identified, a variation of the entered password is generated, in block 306, by replacing at least one second character of the entered password with an alternative character of the at least one second character. When information relating to the variation of the entered password matches information relating to the defined password, the entered password is determined to be valid in block 308.

According to an embodiment, the password validation system 200 can be configured to operate within an execution environment provided by an electronic client device that goes into a locked state when the device is not used for a period or time or when the device is initially powered on. In order to unlock the device, a password is typically entered into a lock screen and the user 110 is allowed to use the device when the entered password matches the password defined by the user 110. Alternatively, or in addition, the password validation system 200 can be configured to operate within an execution environment provided by a server that hosts at least one online service. In this case, the online service typically provides a password protected user account for the user 110 so that access to the user account is granted only when the correct password is submitted to the service. Each embodiment will be discussed to provide a more detailed description of the inventive system.

Implementation on an Electronic Client Device

Figure 4:
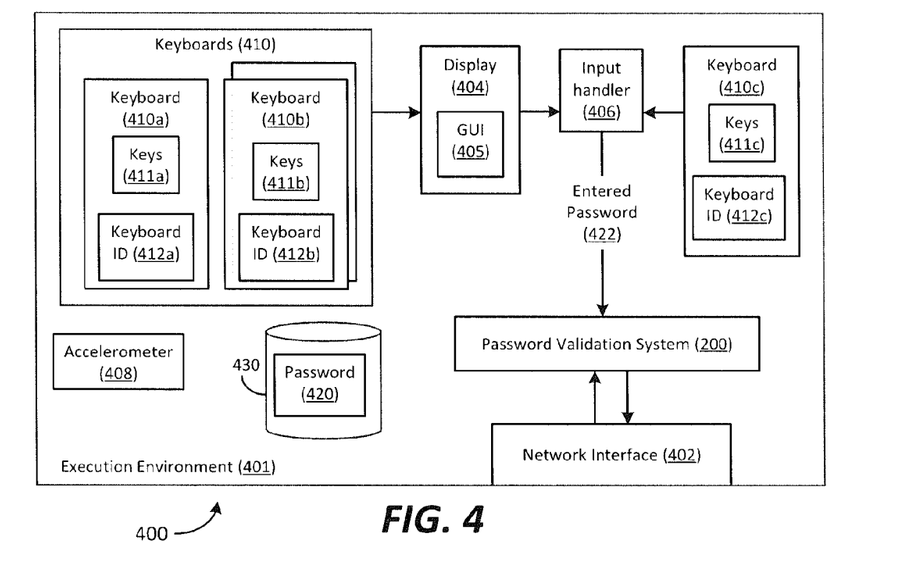
FIG. 4 is a block diagram illustrating an exemplary electronic client device hosting the exemplary system of FIG. 2 according to an embodiment.

FIG. 4 is a block diagram illustrating an exemplary electronic client device 400 that provides an execution environment 401 configured to support operation of the password validation system 200. The electronic client device 400 can include a display 404, a processor, secure storage 430, memory, a network interface 402, an accelerometer 408, a geo-locator sensor, e.g., a Global Positioning System (GPS), and other sensors. According to an embodiment, the user 110 associated with the electronic client device 400 can define a password 420 that unlocks the device 400. The password 420 can be stored in secure storage 430 and can be accessed by the password validation system 200.

According to an embodiment, the electronic client device 400 can provide at least one keyboard 410 that can be used by the user 110 to enter data. For example, when the display 404 is a touch-sensitive screen typical of many mobile communication devices and tablets, the electronic client device 400 can provide at least one virtual keyboard 410a, 410b which can be displayed in a graphical user interface 405 provided by the display 404. Alternatively, or in addition, a physical keyboard device 410c can be provided by or coupled to the electronic client device 400. In all cases, each keyboard, e.g., 410a, includes a plurality of keys 411a corresponding to a plurality of characters.

Figure 6A:
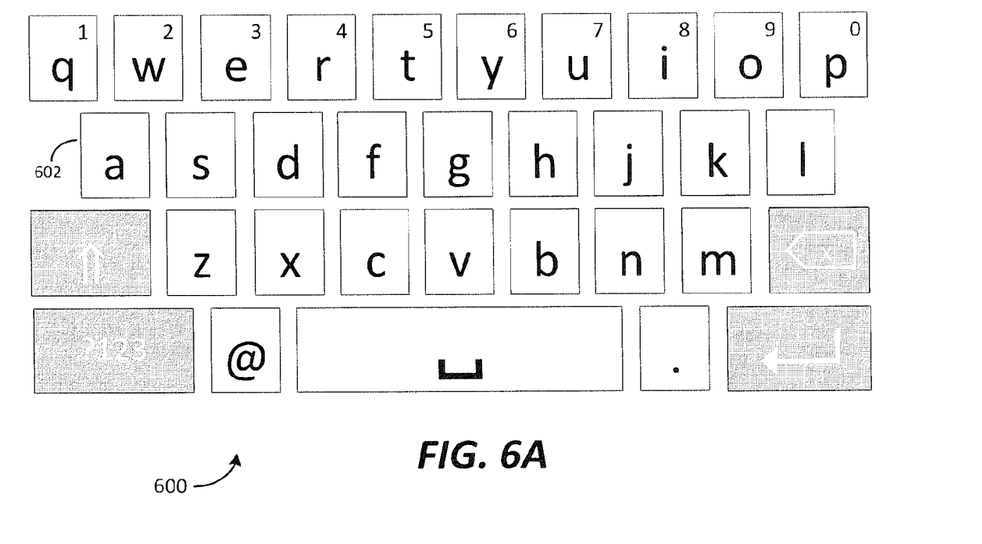
FIG. 6A illustrates an exemplary keyboard according to an embodiment.
Figure 7A:
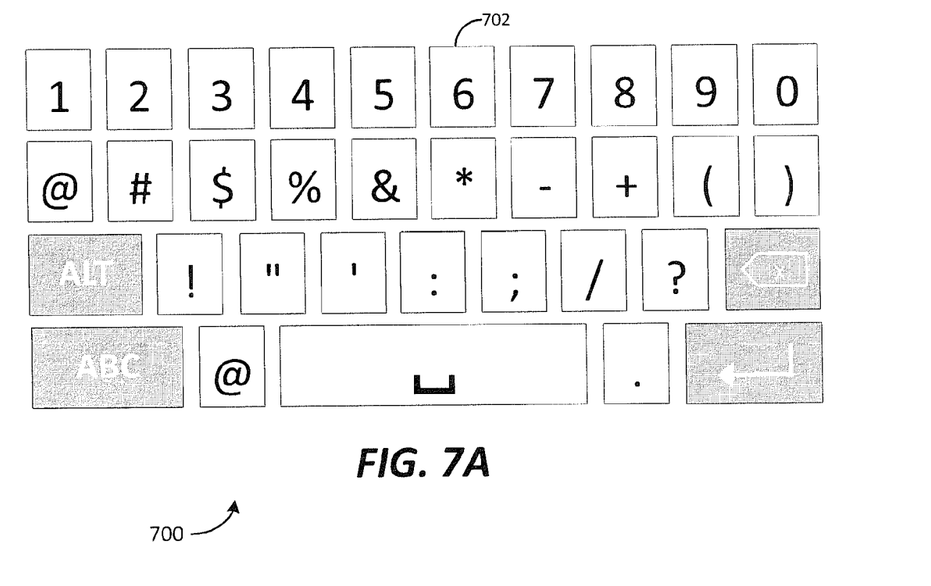
FIG. 7A illustrates another exemplary keyboard according to an embodiment.
Figure 8A:
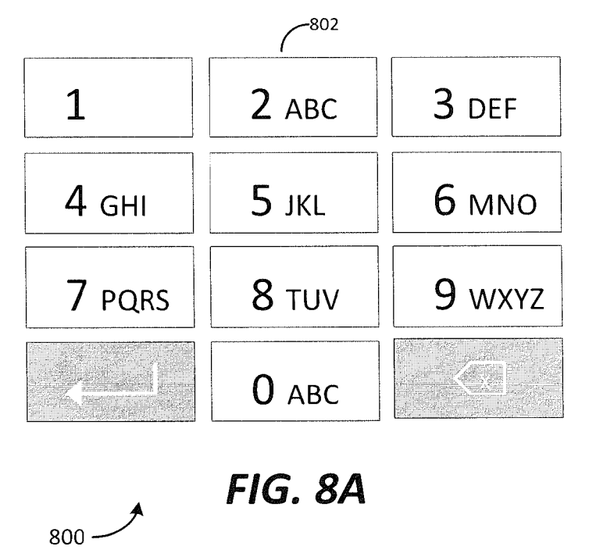
FIG. 8A illustrates another exemplary keyboard according to an embodiment.

For example, FIG. 6A represents a standard "QWERTY" keyboard 600 having keys 602 corresponding to the letters of the English alphabet and other symbols. In FIG. 7A, a different keyboard 700 is illustrated where the keys 702 correspond to numbers and symbols. FIG. 8A is another example of a standard keyboard 800 that represents a numeric keypad where each key 802 corresponds to a number. Other keyboards, virtual and physical, are available and the inventive system described herein is not limited to the keyboards 600, 700, 800 illustrated and mentioned above.

According to an embodiment, the electronic client device 400 can include an input handler component 406 that receives the user's inputs from a virtual keyboard 410a, 410b displayed on the GUI 405 and/or from the physical keyboard 410c. In an embodiment, when the user 110 is prompted to enter a password to unlock the device 400, a default keyboard, e.g., 410a, can be displayed on the GUI 405, and the user 110 can touch or press a key 411a corresponding to a character of the entered password 422. In some cases, more than one keyboard 410a, 410b can be used to enter a password, and therefore, each character entered is associated with a keyboard identifier 412a, 412b identifying the keyboard 410a, 410b used to enter the character. When the input handler 406 receives an indication selecting a key 411a, 411b the input handler 406 can be configured to determine the keyboard identifier 412a, 412b associated with the keyboard 410a, 410b which can then be provided to the password validation system 200 along with the selected key 411a, 411b.

According to an embodiment, when the incoming data handler 202 in the password validation system 200 receives the entered password 422, the password validator 208 can be configured to retrieve the defined password 420 and to compare it to the entered password 422, character by character. In an embodiment, when a character of the entered password 422 does not match a corresponding character in a corresponding position of the defined password 420, the password validator 208 can invoke the alternative character engine 204 to identify alternative characters 205 for at least one of the non-matching characters of the entered password 422.

According to an embodiment, an alternative character 205 for a given character, e.g., a non-matching character of the entered password 422, can be one that corresponds to a key 411a on the keyboard 410a that is within a defined distance on the keyboard 410a from the key 411a corresponding to the given character. For example, in an embodiment, when the defined distance is one adjacent key, the alternative characters 205 of a given character are those corresponding to keys 411a that are located immediately adjacent to the key 411a corresponding to the given character. Alternatively or in addition, when the defined distance is one diagonal key, the alternative characters 205 of a given character are those corresponding to keys 411a that are located immediately diagonal to the key 411a corresponding to the given character.

Figure 6B:
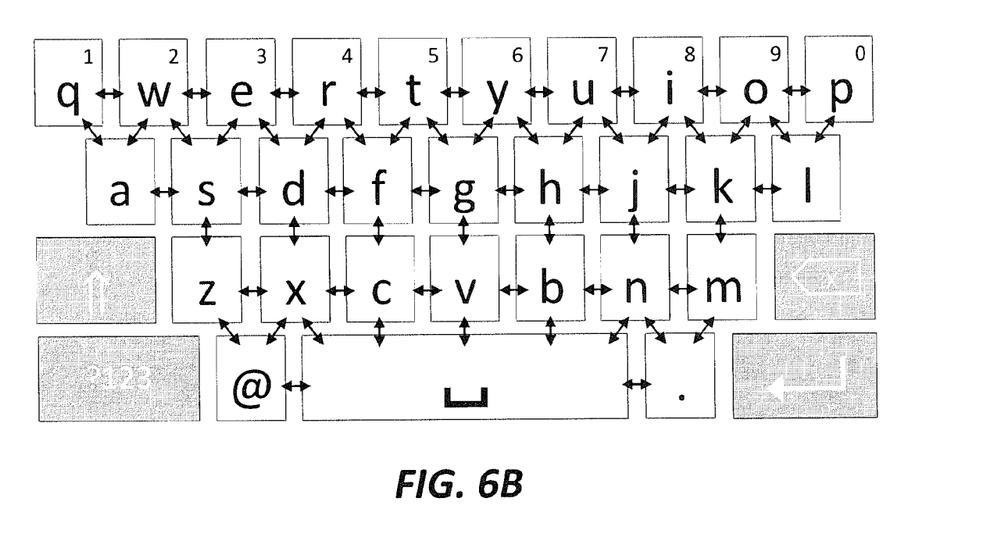
FIG. 6B illustrates exemplary adjacency relationships of the keyboard illustrated in FIG. 6A according to an embodiment.
Figure 7B:
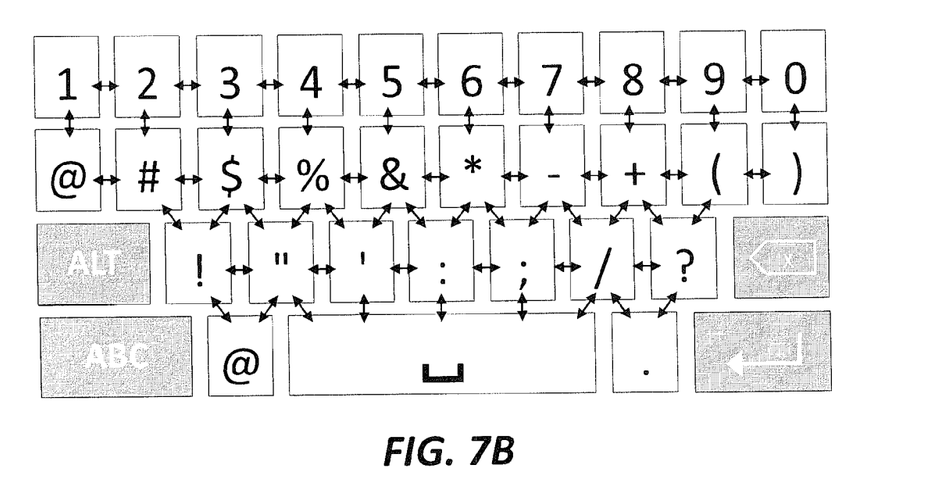
FIG. 7B illustrates exemplary adjacency relationships of the keyboard illustrated in FIG. 7A according to an embodiment.
Figure 8B:
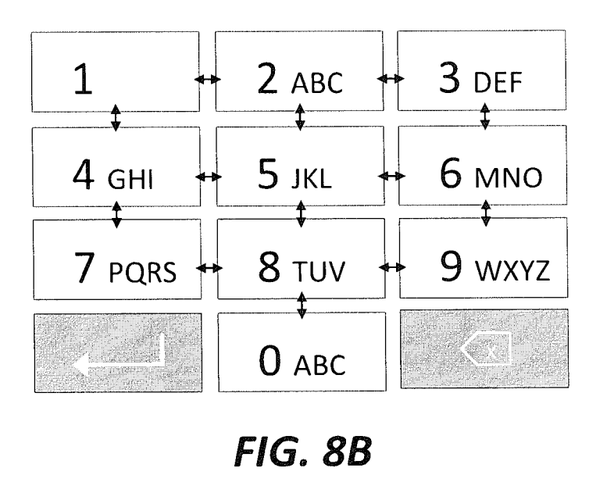
FIG. 8B illustrates exemplary adjacency relationships of the keyboard illustrated in FIG. 8A according to an embodiment.

For example, FIGS. 6B, 7B and 8B illustrate adjacency relationships for keys 602, 702, 802 in the keyboards 600, 700, 800. In FIG. 6B, when the defined distance is one adjacent key, the adjacency relationships for the character "g" indicate that alternative characters 205 for the character "g" can include: t, y, f, h, and v. In addition, when the defined distance is also one diagonal key, the alternative characters 205 for "g" can also include c and b. According to an embodiment, the user 110 or an administrator can select the defined distance to increase or decrease the number of alternative characters for a given character. For instance, the user 110 can select the defined distance to be only one vertical adjacent key. In that case, the alternative characters 205 for "g" would include only t, y and v.

According to an embodiment, some characters can be represented in more than one keyboard. For example, the character "5" can be represented in the keyboards 700, 800 illustrated in FIGS. 7A and 8A. In an embodiment, the alternative character engine 204 in the password validation system 200 can be configured to use the keyboard ID 412a, 412b associated with the keyboard 410a, 410b used to enter the character to identify the appropriate adjacency relationships that provide the correct alternative characters 205 of at least one character of the entered password 422. For example, when the entered password 422 includes the character "5" and the keyboard 700 illustrated in FIG. 7A was used to enter the character, the adjacency relationships associated with the keyboard 700 indicate that the correct alternative characters include 4, 6, and &. Whereas, if the alternative character engine 204 used the keyboard 800 illustrated in FIG. 8A, the adjacency relationships associated with the keyboard 800 would mistakenly identify the alternative characters 205 of 5 to include 2 and 8.

According to an embodiment, when an alternative character 205 for a character of the entered password 422 is identified, the variation generator 206 can generate a variation 207 of the entered password 422 by replacing the character with its alternative character 205. In an embodiment, the variation 207 can be provided to the password validator 208 which can compare the variation 207 to the defined password 440, character by character. When each of the characters of the defined password 420 match the corresponding character of the entered password 422 or an alternative character 205 of the corresponding character, the entered password 422 is determined to be valid. Conversely, when a character of the defined password 420 fails to match either the corresponding character of the entered password 422 or any of its alternative characters, the entered password 422 is determined to be invalid.

In an embodiment, to enhance user security, an entry error value 220 can be provided that defines a maximum number of acceptable mistakes allowed in the entered password 422. An acceptable mistake can be one where an alternative character 205 of a character of the entered password 422 matches the corresponding character of the defined password 420. According to an embodiment, the entry error value 220 can be defined by the user 110 or by an administrator. The entry error value 220 can be defined as a number not exceeding the length of the defined password 420, or it can be defined as a percentage of the length of the defined password 420. In an embodiment, for example, the entry error value can be a ratio of the maximum number of acceptable mistakes to the length of the defined password 420 so that the maximum number of acceptable mistakes varies proportionally with the length of the defined password 420. That is, the longer the password 420, the more acceptable mistakes are allowed.

In another embodiment, the password validation system 200 can automatically set and adjust the entry error value 220 based on an observed error rate. For example, the entry error value 220 can be set initially to zero (0), and when the user 110 has committed an error logging in, the user 110 can be asked if he wishes to increase the entry error value 220 to one (1) for logging in. When the user 110 continues to commit mistakes, the password validation system 200 can suggest increasing the entry error value 220 up to the predetermined maximum number of acceptable mistakes or maximum percentage of the length of the defined password 420.

According to another embodiment, the entry error value 220 can be an adjustable value that varies based on a degree of movement detected in the electronic client device 400. For example, when the user 110 is walking or running and the accelerometer 408 detects a relatively high degree of movement, the entry error value 220 can be adjusted higher from the value 220 when the accelerometer 408 detects a relatively low degree of movement. When the number of acceptable mistakes, i.e., the number of replaced characters in the entered password 422, exceeds the entry error value 220, the password validator 208 can be configured to determine the entered password 422 invalid.

According to an embodiment, the password validation system 200 described above allows for certain substitution errors when entering the password. In particular, when a non-matching character of the entered password 422 is substituted with an alternative character 205 that matches the corresponding character of the defined password 420, the substitution error is forgiven. In an embodiment, the password validation system 200 can also be configured to forgive other types of errors, such as transposition, insertion and deletion errors. A transposition error is one in which two characters that occur next to each other in the entered password 422 are switched in position. For example, if "abcde" is the defined password 420 and "abdce" is the entered password 422, the entered password 422 has a transposition error between the "c" and "d". A deletion error is one in which a character of the defined password 420 is omitted, whereas an insertion error is one in which an additional character has been inserted into the entered password, e.g., when "abcde" is the defined password 420 and "abcxde" is the entered password 422, the entered password 422 has an insertion error, inserting an additional character "x" into the password.

In an embodiment, an edit distance calculator 230 in the password validator 208 can be configured to compute an edit distance between the entered password 422 and the defined password 420. For example, the edit distance can be analogous to the Damerau-Levenshtein distance between the two strings, and the edit distance calculator 230 can be configured to employ an algorithm for computing string to string edit distances using the concepts of edit weights and operations of substitution, transposition, insertion, and deletion. For instance, the Wagner-Fischer algorithm (see R. A. Wagner and M. J. Fischer, "The String-to-String Correction Problem." Journal of the ACM, 21(1):168-173 (1974)) or the Hirschberg algorithm (see D. S. Hirschberg, Commun. ACM 18, 6 341-343 (June 1975)) are well known linear space algorithms for computing maximal common subsequences that can be employed as the basic algorithm.

In this case, the edit distance calculator 230 can be configured to use edit weights of one (1) for transposition, deletion, and insertion errors, and an edit weight of one (1) for substitution errors having an association with an alternative character 205. In an embodiment, an edit weight corresponding to a substitution error having no association with an alternative character is equal to a first weight greater than one (1). When the edit distance is a sum of the edit weights corresponding to the error(s), the entered password 422 can be determined to be valid when the edit distance is at most equal to the first weight. In an embodiment, the first weight can be equal to the maximum number of acceptable mistakes or the entry error value 220.

According to another embodiment, the user 110 can define a password that permits access to the user's user account for a service hosted by a server 111. The defined password can be stored at the server 111, but more typically, a hash value corresponding to the defined password can be stored at the server 111 for enhanced security. For example, at the time the password is defined by the user 110, the hash value corresponding to the defined password can be generated by the electronic client device 400 and transmitted to the server 111. Thereafter when the user 110 logs in to the service using the electronic client device 400, the entered password 422 can be received by the password validation system 200 and a hash engine 210 in the password validator 208 can be configured to generate the hash value corresponding to the entered password 422. The hash value can then be transmitted to the server 111 over the network 121 via the network interface 402.

Typically, when the hash value corresponding to the entered password 422 fails to match the hash value corresponding to the defined password, the server 111 sends a message indicating that the entered password is invalid. Nonetheless according to an embodiment, when the server 111 is configured to implement the FLUB method, the server 111 can send the message indicating that the entered password did not match the defined password and, when the electronic client device 400 is a trusted client, can send the hash value corresponding to the defined password. According to an embodiment, the electronic client device 400 can be a trusted client when it is the same device that was used to define the password, or a device that can be trusted to receive the hash value corresponding to the defined password. In either case, the trusted client device 400 can be configured, in an embodiment, to apply a hash algorithm matching that used to create the hash value corresponding to the defined password. Alternatively or in addition, the server 111 can include an indication identifying the hash algorithm used to generate the hash value corresponding to the defined password.

In an embodiment, the incoming data handler 202 in the password validation system 200 can receive the hash value corresponding to the defined password and provide it to the password validator 208. In the meantime, the alternative characters 205 for the characters of the entered password 422 can be identified and variations of the entered password 207 can be generated, as described above. In an embodiment, when a variation 207 is received by the password validator 208, the hashing engine 210 can be configured to generate a hash value corresponding to the variation of the entered password 207, which can then be compared to the hash value corresponding to the defined password. As stated above, the hash algorithm used to generate the defined password hash is used to generate the hash value corresponding to the variation of the entered password. When the hash values match, the password validator 208 can determine that the entered password 422 is valid. Otherwise, when none of the hash values corresponding to all variations of the entered password match, the entered password 422 is invalid.

According to an embodiment, an entry error value 220 associated with the defined password can be provided that defines the maximum number of acceptable mistakes allowed in the entered password 422. In this case, the entry error value 220 can be provided by the user 110 and/or by an administrator associated with the service. Thus, the entry error value 220 can vary depending on the security risk associated with unauthorized access to the service. For example, the entry error value 220 defined by a financial service that provides access to sensitive information can be less than the entry error value 220 defined by a social networking service that provides access to public information. In an embodiment, the service's entry error value 220 can be provided to the electronic client device 400 along with the hash value corresponding to the defined password.

Implementation on a Server Device

Figure 5:
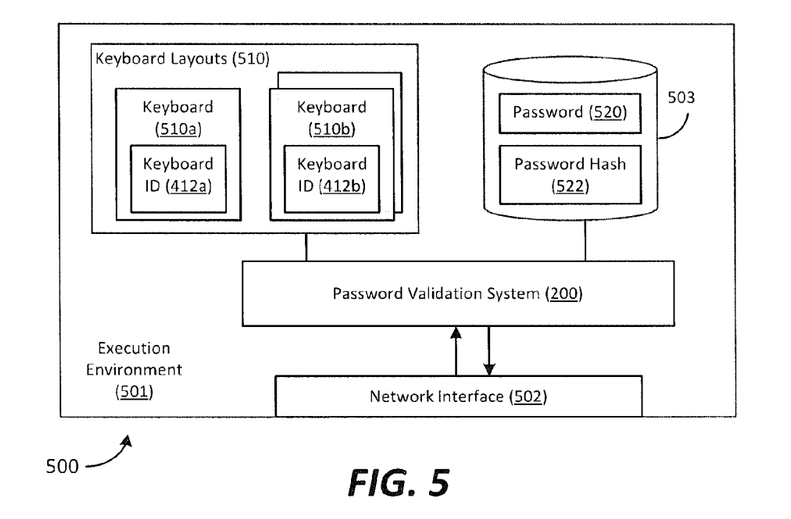
FIG. 5 is a block diagram illustrating an exemplary electronic server device hosting the exemplary system of FIG. 2 according to an embodiment.

According to an embodiment, when the electronic client device 400 is not trusted to receive the hash value corresponding to the defined password, the FLUB method can be implemented at the server 111. FIG. 5 is a block diagram illustrating an exemplary electronic server device 500 that provides an execution environment 501 configured to support operation of the password validation system 200. As is shown, the server 500 includes a storage mechanism 503 for storing, in an embodiment, at least one defined password 520 and/or at least one password hash 522 for at least one user account. In addition, the server 500 includes a plurality of keyboard layouts 510 corresponding to standard keyboards 410 provided by electronic client devices 400. In an embodiment, when a keyboard layout, e.g., 510*a*, corresponds to a keyboard, e.g., 410*a*, the keyboard layout 510*a* can be identified by the identifier 412*a* associated with the corresponding keyboard 410*a*. According to an embodiment, each keyboard layout 510*a* describes an arrangement of the keys 411*a* on the corresponding keyboard 410*a* so that the adjacency relationships between the keys 411*a* can be determined.

According to an embodiment, when the server 500 receives the entered password 422 from the electronic client device 400, the server 500 also receives information identifying at least one keyboard layout 510 corresponding to at least one keyboard 410 provided by the electronic client device 400 and used to generate the entered password 422. In an embodiment, each character of the entered password 422 can be associated with a keyboard layout 510*a*, 510*b* and the identifying information can be the keyboard identifier 412*a*, 412*b*. For example, as described above, at the electronic client device 400, more than one keyboard 410*a*, 410*b* can be used to enter a password, and therefore, each key/character entered can be associated with a keyboard identifier 412*a*, 412*b* identifying the keyboard 410*a*, 410*b* used to enter the key/character. When each character is entered, the associated keyboard identifier 412*a*, 412*b* can be determined and provided to the server 500 along with the entered key/character 411*a*, 411*b*.

When the entered password 422 and the keyboard identifier(s) 412*a*, 412*b* are received by the password validation system 200 in the server 500, the defined password 520 can be retrieved from storage 503 and compared to the entered password 422 character by character. As described above, when a character of the entered password 422 does not match a corresponding character in a corresponding position of the defined password 520, the password validator 208 can invoke the alternative character engine 204 to identify alternative characters 205 for the non-matching character of the entered password 422. In an embodiment, the alternative character engine 204 can be configured to use the keyboard ID, e.g., 412*a*, associated with the non-matching character to identify the corresponding keyboard layout 510*a* used to enter the character, so that the correct adjacency relationships associated with the non-matching character can be used to identify the correct alternative characters 205 of the non-matching character.

According to an embodiment, the keyboard, e.g., 410*c*, used to enter the non-matching character can be a keyboard 410*c* that is customized and/or new. For example, the new keyboard 410*c* can be a new game controller or a custom ergonomic keypad. In this case, the server 500 may not have a keyboard layout 510 corresponding to the custom or new keyboard 410*c*. According to an embodiment, when the non-matching character is associated with a keyboard ID 412*c* unknown to the server 500 the server can transmit a request to the electronic client device 400 for the adjacency relationships associated with the non-matching character and/or with the keyboard 410*c*. In an embodiment, when the adjacency relationships associated with the new keyboard 410*c* are received, a new keyboard layout can be created and stored with the other keyboard layouts 510, and the alternative character engine 204 can identify the correct alternative characters 205 for the non-matching character.

As described above, when an alternative character 205 for a non-matching character of the entered password 422 is identified, the variation generator 206 can generate a variation 207 of the entered password 422 by replacing the non-matching character with its alternative character 205. In an embodiment, the variation 207 can be provided to the password validator 208 which then can compare the variation 207 to the defined password 520, character by character. When each of the characters of the defined password 520 matches the corresponding character of the entered password 422 or an alternative character 205 of the corresponding character, the entered password 422 is determined to be valid. Conversely, when a character of the defined password 520 fails to match either the corresponding character of the entered password 422 or any of its alternative characters, the entered password 422 is determined to be invalid.

In an embodiment, when the server 500 stores a hash value corresponding to the defined password 522, the hash engine 210 in the password validator 208 can be configured to generate a hash value corresponding to the variation of the entered password 207 so that it can be compared to the hash value corresponding to the defined password 522. When the hash values match, the entered password 422 is determined to be valid.

As described above, the service can provide an entry error value 220 that defines a maximum number of acceptable mistakes allowed in the entered password 422. The entry error value 220 can be defined as a number not exceeding the length of the defined password 520, or it can be defined as a percentage of the length of the defined password 520. Alternatively or in addition, the user 110 can determine the entry error value 220 when the entered password 422 is transmitted to the server 500. In this case, the entry error value 220 can vary based on the degree of movement detected in the electronic client device 400.

Moreover, the password validation system 200 implemented in the server 500 can be configured to consider other types of errors, such as transposition, insertion and deletion errors, and can compute an edit distance between the entered password 422 and the defined password 520. As described above, the edit distance calculator 230 can be configured to use edit weights of one (1) for transposition, deletion, and insertion errors, and an edit weight of one (1) for substitution errors having an association with an alternative character 205. In an embodiment, an edit weight corresponding to a substitution error having no association with an alternative character is equal to a first weight greater than one (1). When the edit distance is a sum of the edit weights corresponding to the error(s) in the entered password 422, the entered password 422 can be determined to be valid when the edit distance is at most equal to the first weight.

According to embodiments described, the inventive system allows the user 110 to commit acceptable errors while entering a password so that password verification can occur even though the entered password does not match, character for character, the defined password. Because such errors are forgiven, the user 110 can be more inclined to define long and strong passwords. In an embodiment, the inventive system 200 is particularly useful when the user 110 employs a single password login to access multiple applications or websites, where all of the individual login credentials used for the different applications and/or websites are unique, long, and strong. Using the inventive system 200, the login password can be long and strong, and convenient to enter.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

In addition, one will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for managing user login behavior on an electronic device, the method comprising:
   receiving, by an electronic device, information relating to an entered password having a plurality of second characters of a plurality of characters, wherein the entered password is different from a first password having a plurality of first characters of the plurality of characters;
   identifying for at least one second character, by the electronic device, at least one alternative character of the plurality of characters based on a location of a key corresponding to the at least one second character on a keyboard used to enter the entered password;
   generating, by the electronic device, a variation of the entered password using the identified at least one alternative character;
   providing, at the electronic device, a first entry error value that defines a number of mistakes allowable in the entered password;
   detecting, by the electronic device during a time period related to the entering of the entered password at the electronic device, a degree of movement of the electronic device;
   determining that the detected degree of movement is above a threshold degree of movement;
   increasing the first entry error value, based on the determination of movement above a threshold degree, to obtain an adjusted entry error value that allows for at least one mistake in the entered password; and
   determining, by the electronic device, that the entered password is valid when: information relating to the generated variation of the entered password matches information relating to the first password, and the number of differences between the entered password and the first password does not exceed the adjusted entry error value; and
   after the step of determining, by the electronic device, that the entered password is valid, allowing, using the entered password, access to at least one of a service or a device protected by the first password.

2. The method of claim 1 wherein a first key on the keyboard corresponds to a second character of the entered password and a second key corresponding to an identified alternative character for the second character is located within a defined distance on the keyboard from the first key, and wherein generating, by the electronic device, a variation of the entered password comprises replacing the second character with the identified alternative character.

3. The method of claim 2 wherein the defined distance is one adjacent key, and the second key is located immediately adjacent to the first key on the keyboard.

4. The method of claim 2 wherein the defined distance is one adjacent key or one diagonal key, and the second key is located immediately adjacent to or immediately diagonal to the first key on the keyboard.

5. The method of claim 1 wherein the first entry error value is provided by at least one of the user and an administrator.

6. The method of claim 1 wherein the electronic device is an electronic client device associated with the user, and wherein the electronic client device stores the first password.

7. The method of claim 6 wherein information relating to the variation of the entered password matches information relating to the first password when each of the plurality of first characters of the first password either matches a corresponding second character in a corresponding position of the entered password or matches an identified alternative character of the corresponding second character.

8. The method of claim 7 wherein information relating to the variation of the entered password does not match information relating to the first password when a first character both fails to match a corresponding second character in a corresponding position of the entered password and fails to match all identified alternative characters of the corresponding second character.

9. The method of claim 6 wherein when any variation of the entered password fails to match the first password, the method further comprises:
  calculating an edit distance between the first password and the entered password, wherein the edit distance is a sum of edit weights corresponding to at least one error, wherein an edit weight corresponding to a substitution error having no association with an identified alternative character is equal to a first weight greater than one (1), and wherein an edit weight corresponding to each of an insertion error, a transposition error, a deletion error, and a substitution error having an association with an identified alternative character is equal to one (1); and
  wherein information relating to the variation of the entered password matches information relating to the first password when the edit distance is at most equal to the first weight.

10. The method of claim 1 wherein a mistake allowable in the entered password is one where an identified alternative character of a second character matches a first character in a corresponding position of the first password.

11. The method of claim 10 wherein the first entry error value is an error ratio of the maximum number of acceptable mistakes to a length of the first password so that the maximum number of acceptable mistakes varies proportionally with the length of the first password.

12. The method of claim 10 wherein information relating to the generated variation of the entered password does not match information relating to the first password when a number of identified alternative characters matching first characters in corresponding positions is greater than the adjusted entry error value.

13. The method of claim 1 wherein the variation is generated by replacing the at least one second character with an identified alternative character of the at least one second character and wherein the replaced at least one second character is a letter, number, or punctuation.

14. A method for managing user login behavior on an electronic client device including a keyboard having a plurality of keys corresponding to a plurality of characters, the method comprising:
  storing, on the electronic client device, information relating to a first password, wherein the first password includes a plurality of first characters of the plurality of characters;
  receiving, by the electronic device, an entered password having a plurality of second characters of the plurality of characters, wherein the entered password is different from the first password;
  identifying for at least one second character, by the electronic client device and for at least one second character, at least one alternative character of the plurality of characters based on a location of a key corresponding to a second character of the at least one second character on a keyboard used to enter the entered password;
  generating, by the electronic client device, using the identified at least one alternative character, a variation of the entered password, the variation having a plurality of third characters of the plurality of characters;
  providing, at the electronic device, a first entry error value that defines a number of mistakes allowable in the entered password, wherein the first entry error value is initially set at zero mistakes;
  detecting, by the electronic client device during a time period related to the entering of the received entered password at the electronic client device, a degree of movement of the electronic client device;
  determining that the detected degree of movement is above a threshold degree of movement;
  increasing the first entry error value, based on the determination of movement above a threshold degree, to obtain an adjusted entry error value that allows for at least one mistake in the entered password; and
  determining, by the electronic client device, that the entered password is valid when the number of differences between the entered password and the first password do not exceed the adjusted entry error value, and when each of the plurality of first characters either:
  matches a corresponding second character in a corresponding position of the entered password, or
  matches a corresponding third character in a corresponding position of the generated variation; and
  after the step of determining, by the electronic device, that the entered password is valid, allowing, using the entered password, access to a service and/or a device protected by the first password.

15. A method for managing user login behavior at a server, the method comprising:
  storing, on a server, information relating to a first password, wherein the first password includes a plurality of first characters of a plurality of characters;
  receiving, by the server, an entered password from an electronic client device, the entered password having a plurality of second characters of the plurality of characters;
  identifying for at least one second character, by the server, at least one alternative character of the plurality of characters based on a location of a key corresponding to the at least one second character on a keyboard used to enter the entered password;
  generating, by the server, a variation of the entered password using the identified at least one alternative character;
  providing, by the server, a first entry error value that defines a number of mistakes allowable in the entered password;
  increasing, by the server, the first entry error value to obtain an adjusted entry error value that allows for at least one mistake in the entered password, the increasing being based on a degree of movement of the electronic client device, wherein the degree of movement was detected by the electronic client device during a time period related to the entering of the entered password at the electronic client and was determined to be above a threshold degree of movement; and
  determining, by the server, that the entered password is valid when: information relating to the generated variation of the entered password matches the information relating to the first password, and the number of differences between the entered password and the first password do not exceed the adjusted entry error value; and after the step of determining, by the electronic device, that the entered password is valid, allowing, using the entered password, access to at least one of a service or a device protected by the first password.

16. A method comprising:

receiving an entered password input through a keyboard, the entered password comprising a plurality of first characters;

retrieving a first password comprising a plurality of second characters, the first password being different from the entered password based on at least one character of the entered password not matching a corresponding character in a corresponding position of the first password, wherein each such difference is a mistake in the entered password, and wherein a mistake is acceptable when a location on the keyboard for the mistake in the entered password is adjacent to a location on the keyboard for the corresponding character of the first password;

providing a first entry error value that defines a number of acceptable mistakes allowable in the entered password;

increasing the first entry error value to obtain an adjusted entry error value that allows for at least one mistake in the entered password, the increasing being based on a detected degree of movement of the keyboard that was detected during a time period related to the inputting of the entered password through the keyboard, and the degree of movement determined to be above a threshold degree of movement; and determining that an access should be permitted when the number of acceptable mistakes does not exceed the adjusted entry error value; and after the step of determining that an access should be permitted, allowing, using the entered password, access to at least one of a service or a device protected by the first password.

* * * * *